(12) United States Patent
Butz et al.

(10) Patent No.: US 11,259,622 B2
(45) Date of Patent: Mar. 1, 2022

(54) INTERDENTAL CLEANER

(71) Applicant: INTERBROS GMBH, Schönau (DE)

(72) Inventors: Jürgen Butz, Schönau (DE); Gerhard Pötsch, Freiburg (DE); Markus Rümmele, Häg (DE); Hannes Hauser, Steinen (DE); Steffen Lehr, Todnau (DE)

(73) Assignee: INTERBROS GMBH, Schönau (DE)

( * ) Notice: Subject to any disclaimer, the term of this patent is extended or adjusted under 35 U.S.C. 154(b) by 923 days.

(21) Appl. No.: 14/420,171

(22) PCT Filed: Jul. 20, 2013

(86) PCT No.: PCT/EP2013/002154
§ 371 (c)(1),
(2) Date: Feb. 6, 2015

(87) PCT Pub. No.: WO2014/023395
PCT Pub. Date: Feb. 13, 2014

(65) Prior Publication Data
US 2015/0282601 A1 Oct. 8, 2015

(30) Foreign Application Priority Data

Aug. 9, 2012 (DE) ...................... 10 2012 015 663.4

(51) Int. Cl.
*A46B 1/00* (2006.01)
*A46B 9/06* (2006.01)
(Continued)

(52) U.S. Cl.
CPC ................ *A46B 1/00* (2013.01); *A46B 3/005* (2013.01); *A46B 3/20* (2013.01); *A46B 9/02* (2013.01);
(Continued)

(58) Field of Classification Search
CPC .. A46B 1/00; A46B 3/005; A46B 3/20; A46B 9/02; A46B 9/021; A46B 9/04;
(Continued)

(56) References Cited

U.S. PATENT DOCUMENTS 3,124,823 A * 3/1964 Charvat .................. A46B 3/18
15/206
4,395,943 A * 8/1983 Brandli .................... A46B 3/18
15/167.1
(Continued)

FOREIGN PATENT DOCUMENTS

CN 1329475 A 1/2002
CN 201061567 Y 5/2008
(Continued)

*Primary Examiner* — Joel D Crandall
(74) *Attorney, Agent, or Firm* — McGlew and Tuttle, P.C.

(57) ABSTRACT

An interdental cleaner with a rod-like support which has a cleaning device in an axial end region. The cleaning device includes a cover on the support made of a soft-elastic plastic, and structuring is formed on the outside of the cover having a plurality of fingers protruding with radial components from the cover, which fingers are made of the same material as the cover and are connected as one piece thereto. The structuring additionally has a bristle edging with a plurality of bristle bundles protruding with radial components from the cover and/or individual bristles which are each formed from pre-produced bristles embedded in the cover and/or in the support.

20 Claims, 8 Drawing Sheets

(51) Int. Cl.
*A46B 3/00* (2006.01)
*A46B 3/20* (2006.01)
*A46B 9/02* (2006.01)
*A61C 15/00* (2006.01)

(52) U.S. Cl.
CPC ............... *A46B 9/06* (2013.01); *A61C 15/00* (2013.01); *A46B 2200/108* (2013.01)

(58) Field of Classification Search
CPC .......... A46B 2200/108; A46B 2200/40; A46B 2200/1073; A46B 2200/1086; A46B 3/18; A46B 3/00; A46B 3/02; A46B 3/04; A61C 15/00
See application file for complete search history.

(56) References Cited

U.S. PATENT DOCUMENTS

| | | | | |
|---|---|---|---|---|
| 5,165,760 A * | 11/1992 | Gueret | ............ | A46B 3/18 300/21 |
| 5,638,568 A * | 6/1997 | Dumler | ............ | A46B 3/18 15/167.1 |
| 6,279,583 B1 * | 8/2001 | Neuner | ............ | A46B 3/18 132/218 |
| 6,767,209 B1 | 7/2004 | Tomita et al. | | |
| 2003/0027101 A1 | 2/2003 | Victoria | | |
| 2005/0115011 A1 * | 6/2005 | Petit | ............ | A46B 3/08 15/191.1 |
| 2006/0260080 A1 * | 11/2006 | Hsu | ............ | A46B 9/028 15/167.1 |
| 2006/0272668 A1 * | 12/2006 | Wyatt | ............ | A45D 34/04 132/218 |
| 2008/0060669 A1 * | 3/2008 | Malvar | ............ | A45D 40/262 132/218 |
| 2008/0245382 A1 * | 10/2008 | Marciniak-Davoult | ............ | A45D 40/265 132/200 |
| 2009/0193602 A1 | 8/2009 | Dumler et al. | | |
| 2009/0230756 A1 | 9/2009 | Crossman | | |
| 2010/0024839 A1 | 2/2010 | Kalbfeld et al. | | |
| 2010/0175708 A1 * | 7/2010 | Kim | ............ | A45D 40/262 132/218 |
| 2011/0041271 A1 | 2/2011 | Huang | | |
| 2011/0226276 A1 * | 9/2011 | Limongi | ............ | A46B 9/021 132/218 |
| 2012/0298128 A1 * | 11/2012 | Hodgetts | ............ | A61K 8/922 132/218 |
| 2013/0340185 A1 * | 12/2013 | Patel | ............ | A61C 15/00 15/104.93 |

FOREIGN PATENT DOCUMENTS

| | | | | |
|---|---|---|---|---|
| CN | 101496673 A | 8/2009 | | |
| CN | 201384174 Y | 1/2010 | | |
| CN | 101959440 A | 1/2011 | | |
| DE | 203 08 452 U1 | 7/2003 | | |
| DE | 10 2005 026268 A1 | 12/2006 | | |
| EP | 0 354 352 A1 | 2/1990 | | |
| EP | 1 147 750 A1 | 10/2001 | | |
| EP | 0 932 371 B1 | 12/2001 | | |
| EP | 2 084 987 A1 | 8/2009 | | |
| EP | 2389833 A2 * | 11/2011 | ............ | A46D 1/0207 |
| FR | 2916328 A1 * | 11/2008 | ............ | A46B 3/18 |
| WO | 2009/113681 A1 | 9/2009 | | |

* cited by examiner

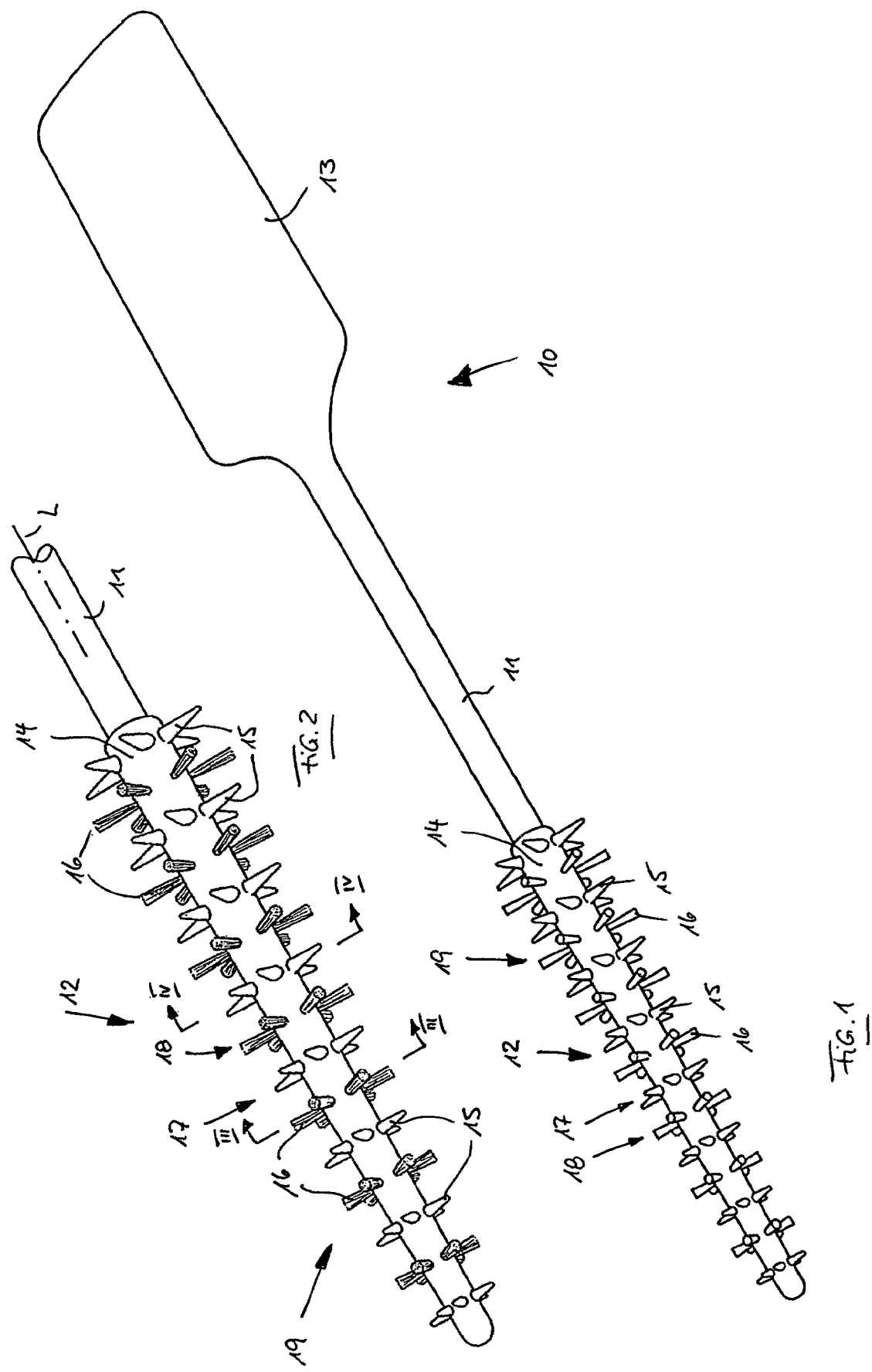

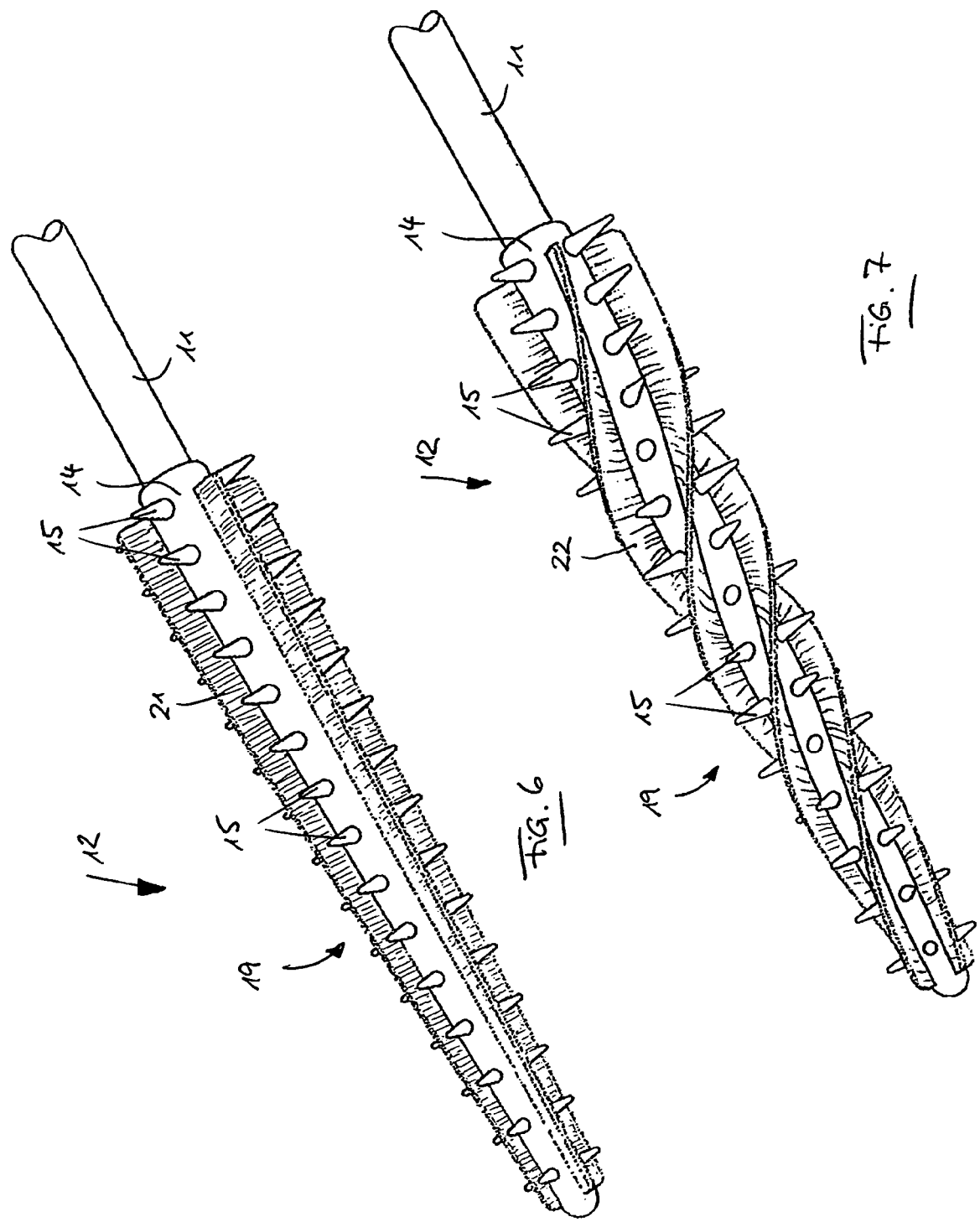

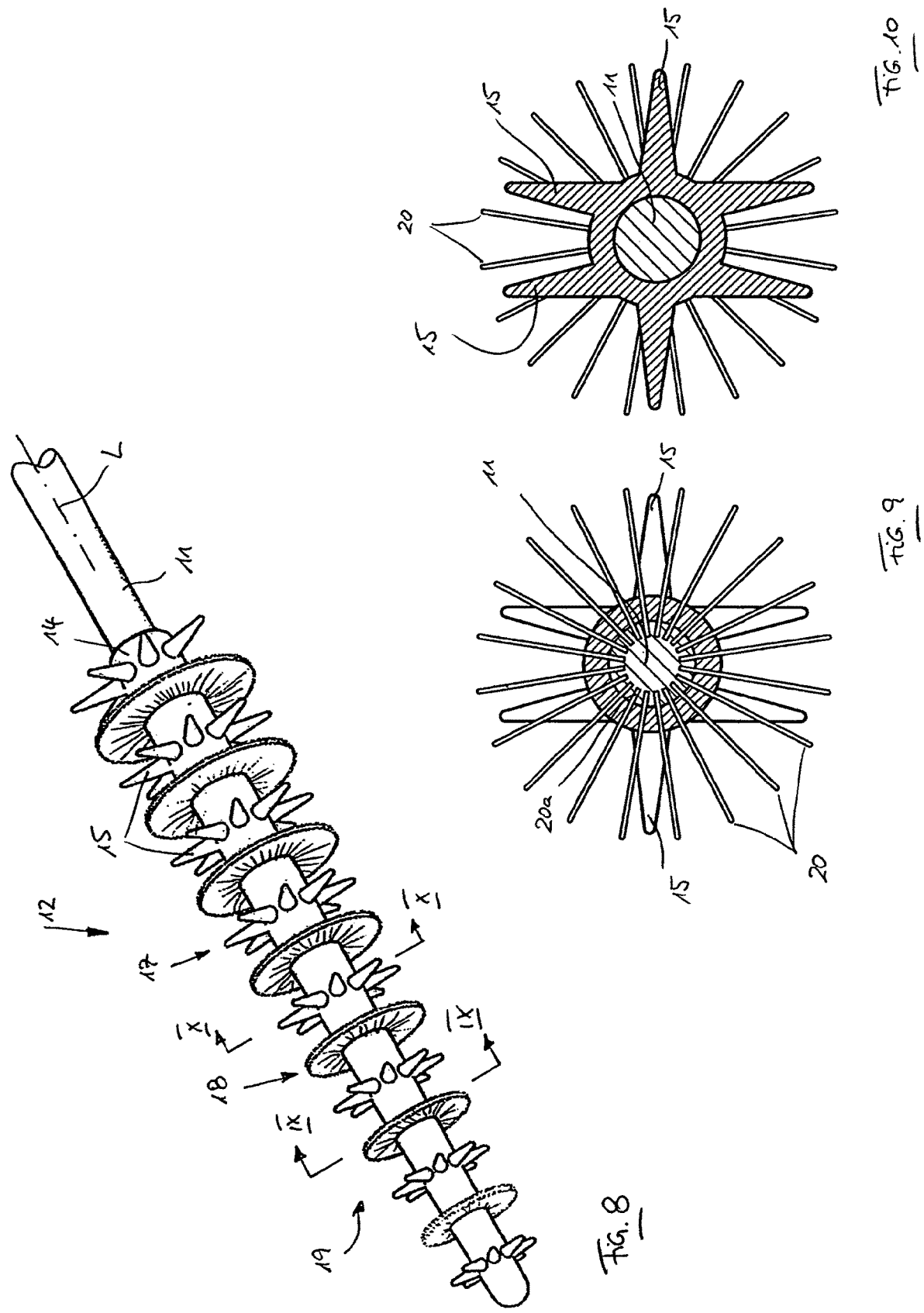

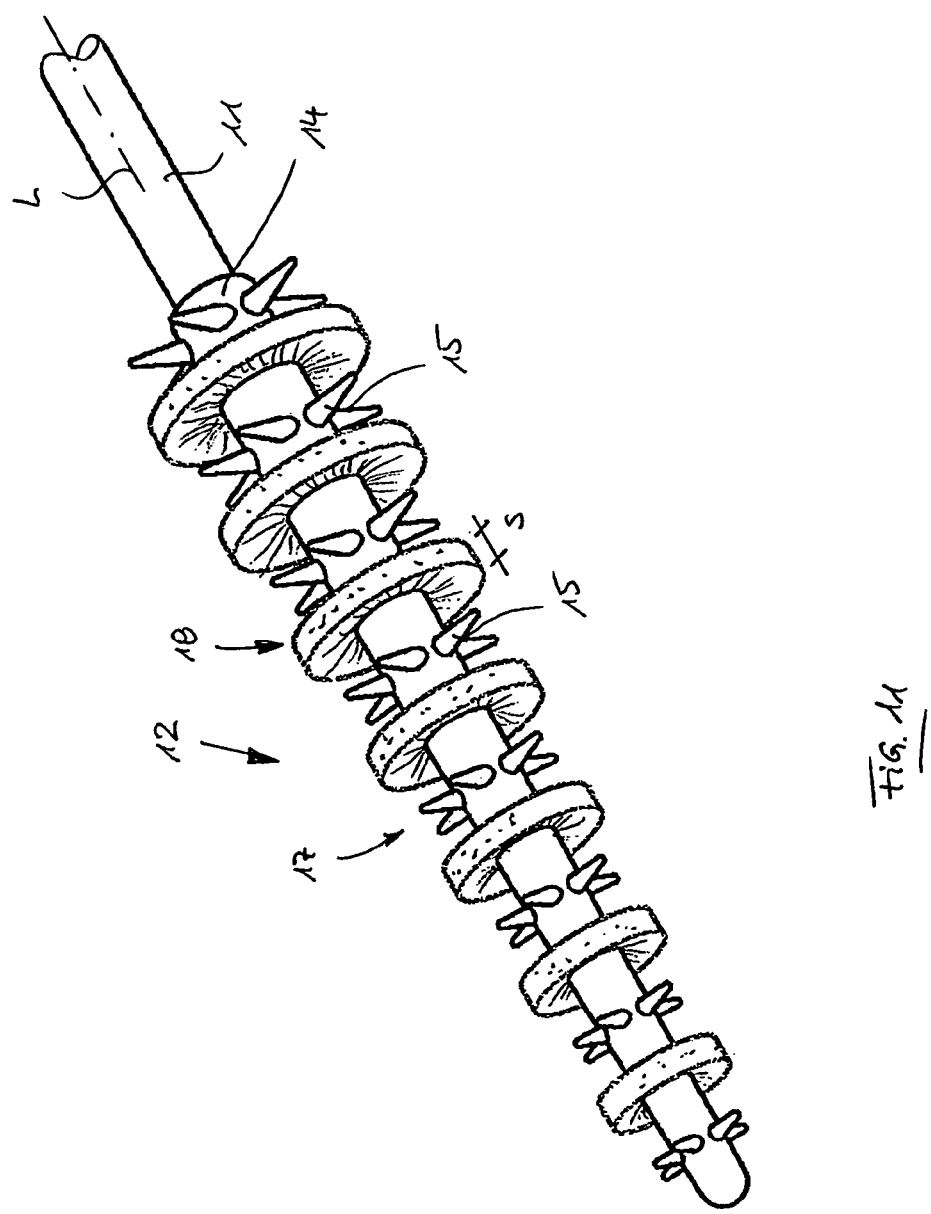

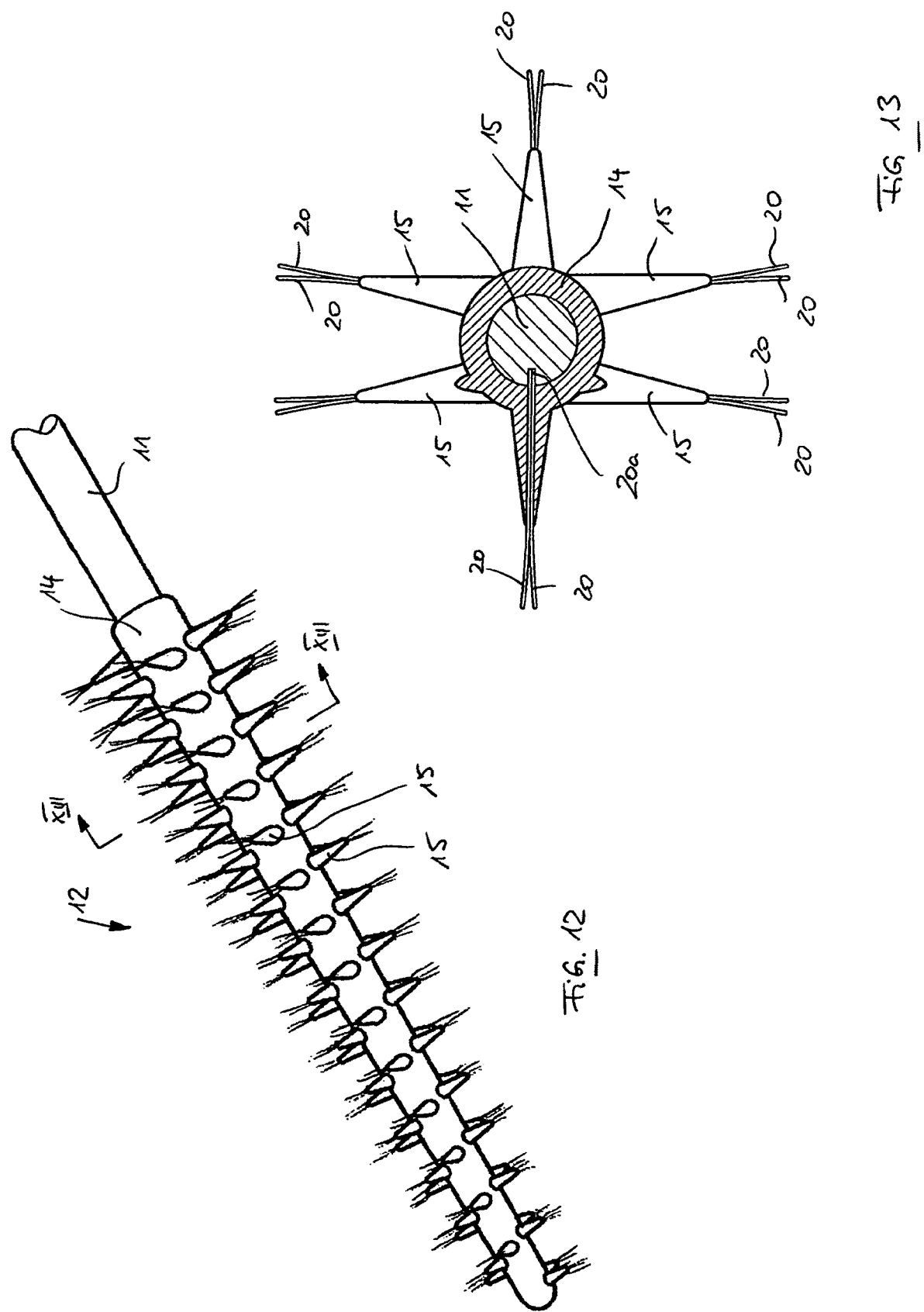

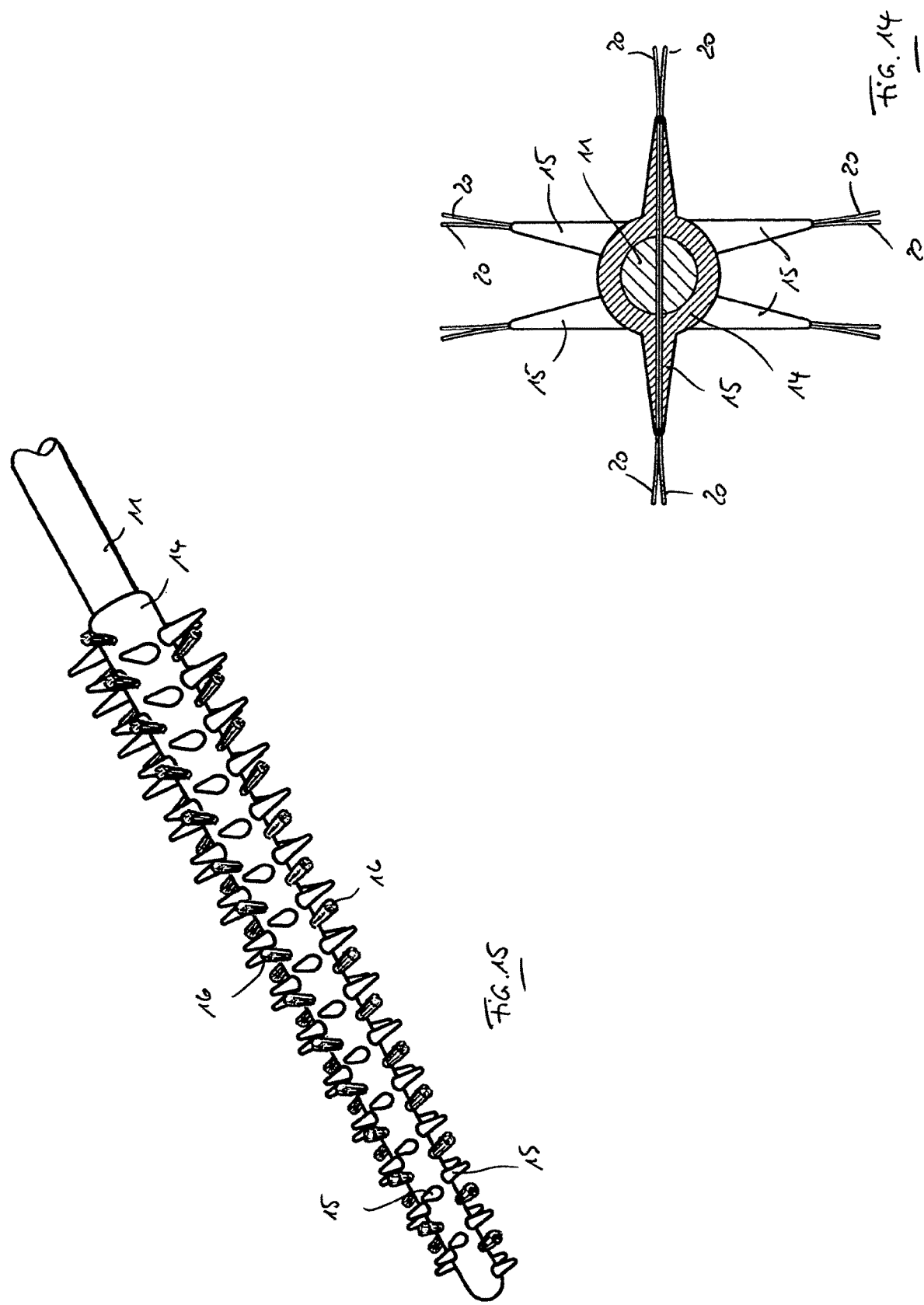

INTERDENTAL CLEANER

CROSS REFERENCE TO RELATED APPLICATIONS

This application is a United States National Phase application of International Application PCT/EP2013/002154 filed Jul. 20, 2013 and claims the benefit of priority under 35 U.S.C. § 119 of German patent application DE 10 2012 015 663.4 filed Aug. 9, 2012, the entire contents of which are incorporated herein by reference.

FIELD OF THE INVENTION

The present invention pertains to an interdental cleaner with a rod-like support, which has a cleaning device in an axial end area, wherein the cleaning device comprises a cover of the support consisting of a flexible plastic and wherein a structuring, which has a plurality of fingers projecting from the cover with a radial component and which consist of the same material as the cover and are connected with this in one piece, is formed on the outer side of the cover.

BACKGROUND OF THE INVENTION

A corresponding interdental cleaner is known from EP 0 932 371 B1. The interdental cleaner described there has a rod-like support consisting of a first plastic, which has a grip part at one of its ends and a cleaning device in the form of a cover of the support at its axially opposite end. The cover consists of a flexible plastic, for example, a thermoplastic elastomer, and is molded on the support. The cover has a structuring on its outer side in the form of nubs or fingers extending radially outwardly. The user grips the grip part and moves the rod-like support with the end carrying the cover into an interdental space and moves the interdental cleaner to and fro, as a result of which the interdental space is cleaned and possibly adhering particles are dislodged.

It has been shown that very good cleaning of the interdental spaces is possible with this interdental cleaner, but it is difficult to also remove contaminants or deposits from very narrow, fine pockets of the teeth.

SUMMARY OF THE INVENTION

The basic object of the present invention is to provide an interdental cleaner of the type mentioned, with which cleaning can also be achieved in narrow pockets and gaps in a reliable manner.

This object is accomplished by an interdental cleaner according to the present invention. Provisions are made here for the structuring to also have, in addition to the fingers projecting from the cover with a radial component, a bristle border with a plurality of bristle bundles projecting from the cover with a radial component, which are formed each by prefabricated bristles embedded in the cover and/or in the support.

Bristles in the sense of this application are thin prefabricated sections of a monofilament or multifilament consisting of a plastic, which have a maximum diameter of 0.25 mm.

The term "axial" used in this text relates to the longitudinal axis of the rod-like support and thus also to the longitudinal axis of the cover. The term "radial" correspondingly relates to a direction extending at right angles to the axial longitudinal direction.

The fingers and/or bristle bundles and/or individual bristles may extend either radially, i.e., at right angles to the longitudinal axis of the interdental cleaner, or also obliquely in relation to this, which is expressed by the phrase "with a radial component."

The cover is preferably molded on the rod-like support in the known manner and may consist of a thermoplastic plastic, for example, a thermoplastic elastomer based on SEBS or ethylene-propylene-diene rubber or of another soft plastic, for example, silicone. The cover is preferably of a sleeve-like design and has a shape following the longitudinal extension of the rod-like support.

Based on the joint arrangement of fingers and bristle border on the outer side of the cover, a good cleaning effect can be achieved in a combined manner. The projecting fingers, which undergo deformation and bend when the interdental cleaner is inserted into the interdental space, are used essentially to clean the surfaces of the interdental space. Based on the small dimensions of the bristles, these can, however, also enter narrow gaps and intermediate spaces and clean these, which could not otherwise be cleaned with the fingers.

The fingers are connected with the cover in one piece and consist of the same material as this. They are produced together with the formation of the cover, preferably according to an injection molding method, during the manufacture of the interdental cleaner.

The bristle bundles or individual bristles extend outwardly radially or at least with a radial direction component. Provisions are made in a preferred embodiment of the present invention for the bristle bundles and/or individual bristles to pass fully through the cover and to be held on the support. The bristle bundles and/or individual bristles may either be fastened to the support, but it is also possible that the support consists of a plastic and the bristle bundles and/or individual bristles are embedded in the support in some sections and are preferably held secured against being pulled out. It can be achieved hereby, for example, that the bristle bundles and/or individual bristles are positioned at least in an injection mold and then sprayed around with the material of the support in desired sections, as a result of which the bristle bundles and/or individual bristles are fixed. The bristle bundles and/or individual bristles can thus be held on the support in a positive-locking manner or by connection in substance. The cover consisting of the flexible plastic can be subsequently molded, and the fingers connected with the cover in one piece can be formed at the same time.

Various geometric configurations are possible for arranging the fingers and bristle border or bristle bundles and/or individual bristles. Provisions may be made in a possible embodiment of the present invention for arranging a plurality of bristle bundles and/or individual bristles preferably distributed uniformly over the circumference of the cover, forming a bristle crown. A plurality of bristle crowns arranged at axially spaced locations may be provided in the longitudinal direction of the cover. The bristle bundles and/or individual bristles of the bristle crown may be arranged at mutually spaced locations in the circumferential direction, but it is also possible to arrange the bristle bundles and/or individual bristles so close to one another that the bristle crown forms a bristle disk extending circumferentially at right angles to the axial longitudinal direction of the cover.

Furthermore, it is possible that at least some of the bristle bundles are arranged offset in relation to adjacent bristle bundles in the longitudinal direction of the interdental cleaner.

Provisions may be made in a possible embodiment of the present invention for a plurality of fingers to be arranged distributed over the circumference of the cover, forming a finger crown. A plurality of finger crowns are preferably arranged at mutually spaced locations in the axial direction of the cover, and provisions may be made in a possible embodiment of the present invention for the bristle crowns and finger crowns to be arranged alternatingly in the axial longitudinal direction of the cover.

Moreover, provisions may be made for at least some of the fingers to be arranged offset in the longitudinal direction of the interdental cleaner in relation to adjacent fingers.

The fingers, which preferably have a radially outwardly tapering, conical shape, for example, in the form of a circular cone, project from the cover with their length. Provisions are made in a preferred embodiment of the present invention for the bristle bundles and/or individual bristles to have a greater projecting length, so that at least some of the bristle bundles and/or some of the individual bristles project radially in the radial direction over the fingers by a measure M, wherein the measure M is in the range of 0.1 mm to 1.5 mm, preferably in the range of 0.3 mm to 0.7 mm and especially preferably in the range of 0.4 mm to 0.6 mm.

Provisions may be made in another possible embodiment of the present invention for at least some of the fingers to project radially over the bristle bundles and/or individual bristles by a measure N, wherein the measure N is in the range of 0.1 mm to 1.5 mm, preferably in the range of 0.3 mm to 0.7 mm, and especially preferably in the range of 0.4 mm to 0.6 mm.

The bristle bundles may be arranged as isolated bristle bundles, i.e., at a spaced location from adjacent bristle bundles. This also applies to individual bristles. Provisions are made in a possible embodiment of the present invention for at least some of the bristle bundles and/or individual bristles to be arranged in one or more rows of bristles extending in the longitudinal direction of the cover. The bristle bundles and/or individual bristles, which form a row of bristles, are preferably arranged so close adjacent to one another that a continuous, gapless row of bristles is formed. The rows of bristles may extend in a straight line in the longitudinal direction of the cover, but provisions may also be made, as an alternative or in addition hereto, for the rows of bristles to extend helically in the longitudinal direction of the cover.

The bristle bundles and/or individual bristles may be arranged independently from one another the fingers on the outer side of the cover. However, provisions may be made in a variant of the present invention, as an alternative or in addition hereto, for a bristle bundle and/or at least one individual bristle to pass through at least one of the fingers. More than half of the length of the individual bristle or of the bristles forming the bristle bundle is preferably arranged now in the interior of the fingers and projects from this with its free end from the finger preferably at the radially outer end of the finger, i.e., the fingertip.

It proved to be advantageous if 1 to 4 individual bristles pass through the fingers.

Provisions may be made in a possible embodiment of the present invention for the bristle bundles and/or individual bristles to be held at their radially inner end in the support and especially to be embedded in this. However, it is also possible, as an alternative, that the bristle bundle and/or individual bristle passes radially through the support and projects from this on opposite sides. In its middle area, which is arranged within the support, the bristle bundle and/or individual bristle is held in the support and is especially embedded in this.

Provisions may be made in another possible embodiment of the present invention for the bristle bundles and/or individual bristles to be U-shaped or V-shaped and to be embedded with their base section in the support, so that they project radially with their free ends in the aforementioned manner.

Provisions may be made in another possible embodiment of the present invention for the bristle bundles and/or the individual bristles to be L-shaped and to be embedded with one of the legs of their L shape in the support and to project from this with the other leg of the L. The leg of the L that is embedded in the support may extend now in the longitudinal direction of the interdental cleaner, i.e., in the axial direction, while the other leg of the L extends essentially at right angles thereto, i.e., radially or obliquely in relation thereto.

The bristles may be held in the support in a positive-locking manner or by connection in substance. Especially good positive-locking mounting of the bristle bundles and/or individual bristles is ensured if a thickening in the form of a broadened head, which is embedded in the material of the support, is formed at an axial end of the bristle bundles and/or individual bristles. A corresponding head may be formed, for example, by upsetting the bristle bundle and/or individual bristles, optionally with prior heating in a manner known per se.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of an interdental cleaner according to a first exemplary embodiment;

FIG. 2 is an enlarged view of the front end of the interdental cleaner according to FIG. 1;

FIG. 6 is a view of the front end of an interdental cleaner according to a second exemplary embodiment;

FIG. 7 is view of a variant of the embodiment according to FIG. 6;

FIG. 8 is a view of the front end of an interdental cleaner according to a third exemplary embodiment;

FIG. 9 is a sectional view according to IX-IX in FIG. 8;

FIG. 10 is a sectional view according to section X-X in FIG. 7;

FIG. 11 is view of a variant of the embodiment according to FIG. 8;

FIG. 12 is a view of the front end of an interdental cleaner according to a fourth exemplary embodiment;

FIG. 13 is a sectional view according to XIII-XIII in FIG. 12;

FIG. 14 is a view of a variant of the embodiment according to FIG. 13;

FIG. 15 is a view of a variant of the embodiment according to FIG. 2;

DESCRIPTION OF THE PREFERRED EMBODIMENTS

Figure 5:
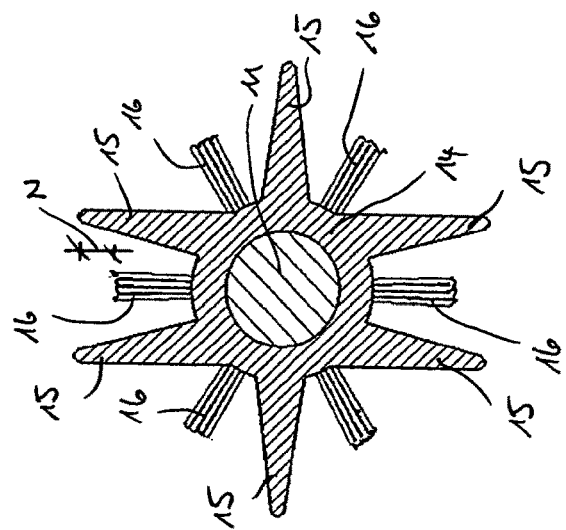
FIG. 5 is a sectional view of a variant of the embodiment according to FIG. 4.

FIG. 1 shows a perspective view of an interdental cleaner 10, which has a rod-like support 11 consisting of a plastic and at the rear end of which, which is the right-hand end according to FIG. 1, a grip section 13 is formed, by which a user can grip the interdental cleaner 10.

A cleaning device 12 is mounted on the rod-like support 11 at the front end located axially opposite the grip section 13, the left-hand end according to FIG. 1. This [cleaning device] has a cover 14 of the support 11, said cover 14 preferably consisting of a flexible plastic and having a structuring 19 on its outer side.

Figure 4:
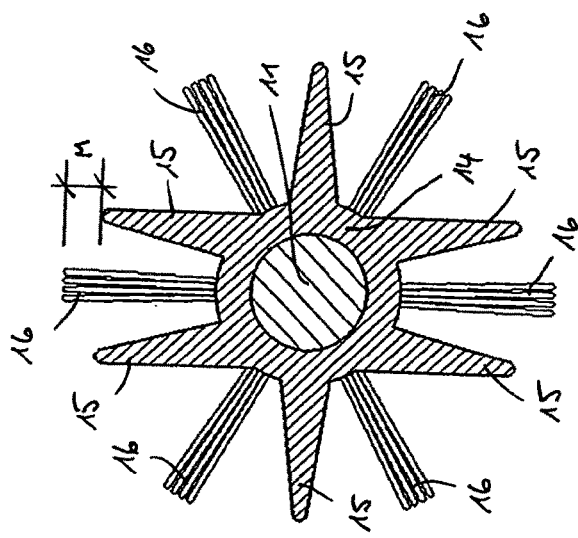
FIG. 4 is a sectional view according to IV-IV in FIG. 2.
Figure 3:
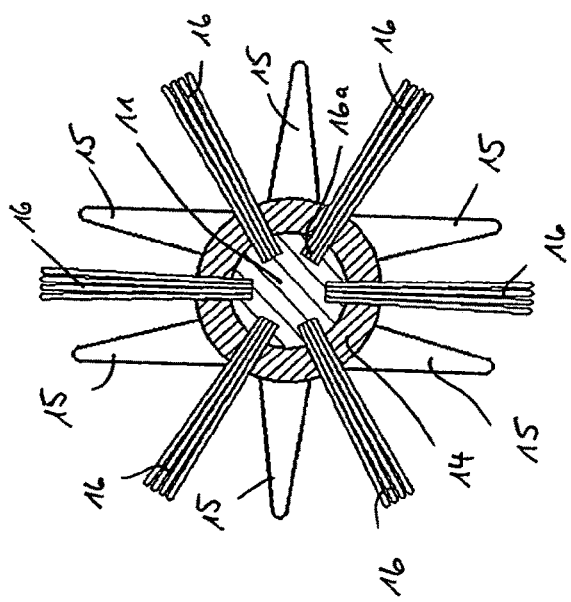
FIG. 3 is a sectional view according to III-III in FIG. 2.

FIGS. 2 through 4 show details of the design and of the components of the cleaning device 12 and of the structuring 19.

The cover 14 has on its outer side radially outwardly projecting, freely projecting fingers 15, which consist of the same material as the cover 14 and is made in one piece with this, as this is shown in FIG. 4. The fingers 15 have a radially outwardly tapering conical shape (shown, for example, as a circular cone here). Six fingers each are arranged distributed over the circumference of the cover 14 in a plane extending at right angles to the longitudinal axis L of the support 11 in the exemplary embodiment shown, and they form a finger crown 17. As is shown in FIG. 2, a plurality of finger crowns 17 arranged at axially spaced locations are provided in the axial longitudinal direction. A bristle crown 18 each is arranged between adjacent finger crowns 17. Each bristle crown 18 comprises six bristle bundles 16, which are embedded in the support 11 with their radially inner ends (see FIG. 3), pass through the cover 14 and project from this radially outwardly. As is shown in FIG. 4, the freely projecting length of at least some of the bristle bundles is greater than the freely projecting length of the fingers 15, so that the free ends of the bristle bundles 16 project radially outwardly over the fingers 15 by a measure M, which is in the range of 0.1 mm to 1.5 mm.

FIG. 5 shows a view similar to that in FIG. 4, but the fingers 15 project radially over the bristle bundles 16 by a measure N here. The measure N is in the range of 0.1 mm to 1.5 mm, so that the fingers 15 project radially outwardly over the bristle bundles 16.

As is shown in FIGS. 3 and 4, the fingers 15 and the bristle bundles 16 are oriented in the circumferential direction such that one bristle bundle 16 each is arranged in the projection between two fingers 15 and one finger 15 is arranged between two adjacent bristle bundles 16.

FIG. 6 shows a second exemplary embodiment, which differs from the first exemplary embodiment according to FIGS. 1 through 4 in the arrangement and orientation of the bristle border. According to FIG. 6, the bristle border is formed by a plurality of rows of bristles 21, which extend in the longitudinal direction of the cover 145 and of the rod-like support 11 and which extend in a straight line in the longitudinal direction of the cover 14 and form a tight, gapless "bristle wall." According to the exemplary embodiment shown, four straight rows of bristles are distributed uniformly over the circumference of the cover 14, and a row of fingers 15 each is arranged between two rows of bristles located adjacent to one another in the circumferential direction.

FIG. 7 shows a variant of the embodiment according to FIG. 6 and differs from this in that the rows of bristles 22 extend helically in the longitudinal direction of the cover 14 and thus wind around this. A row of fingers 15 each is provided between two rows of bristles 22 located adjacent to one another in the circumferential direction in this case as well.

FIGS. 8 through 10 show a third exemplary embodiment, which is a variant of the exemplary embodiment according to FIGS. 1 through 4 and differs from these in that the bristle crowns 18 are formed by a plurality of individual bristles 20 here, which are arranged tightly packed such that the bristle crowns 18 are formed in the manner of a continuous bristle disk, which extend at right angles to the longitudinal axis L of the cover 14.

As is shown in FIG. 9, the individual bristles 20 are embedded at their radially inner ends in the material of the support 11 and pass through the cover 14 and project freely from this radially.

FIG. 11 shows a variant of the embodiment according to FIG. 8 and differs from this in that the bristle crowns 18 or bristle disks have a substantially larger dimension in the axial direction of the cover 14 or support 11, i.e., they are substantially thicker and have a thickness s in the range of 0.5 mm to 1.0 mm.

The fingers 15, on the one hand, and the bristle border, i.e., the bristle bundles 16 and individual bristles 20, on the other hand, were each formed and mounted or held independently from one another in the exemplary embodiments shown hitherto.

FIGS. 12 and 13 show another exemplary embodiment of the interdental cleaner according to the present invention, in which individual bristles 20 are provided, through which the fingers 15 pass.

The interdental cleaner 10 has the design mentioned with the rod-like support 11 and with the cover 14, which carries a plurality of radially outwardly projecting fingers 15 formed in one piece on its outer side. As is shown in FIG. 13, two individual bristles 20 pass through each finger 15. The individual bristles 20 are embedded at their radially inner ends in the material of the support 11 and extend from there radially outwardly through the finger 15 and exit at the radially outer end thereof, i.e., at the tip of the finger 15, and project radially from this. The individual bristles 20 and the corresponding finger 15 mutually affect one another in this manner by the individual bristles 20 imparting a higher bending resistance to the finger 15 and the finger 15 supports the individual bristles 20 over a substantial section of its axial length, so that the risk of kinking of the bristles 20 is reduced.

FIG. 14 shows a variant of the embodiment according to FIG. 13. Two individual bristles 20 extend through the fingers 15 in the radial direction and exit from the finger at the outer tip of the finger 15 in this case as well. However, the individual bristles 20 are not held with their inner ends in the material of the support 11, but they pass through the support 11 and a finger 15 arranged on the opposite side and exit from it [the support] at the radially outer end thereof. The individual bristles 20 are thus arranged within the support and are held in same in a middle area.

The bristle bundles 16 and/or individual bristles 20 and/or fingers 15 were arranged in circumferential finger crowns in the above-mentioned exemplary embodiments. FIG. 15 shows now an exemplary embodiment in which the fingers are arranged each offset in the axial direction or the longitudinal direction of the interdental cleaner in relation to the adjacent fingers. This applies to the bristle bundles 16 and/or individual bristles. It is achieved in this manner that when the interdental cleaner is pushed axially into an interdental space, the fingers 15 come into contact with the surface of the tooth one after another, as a result of which the resistance is reduced. This also applies to the bristle bundles 20.

Figure 16:
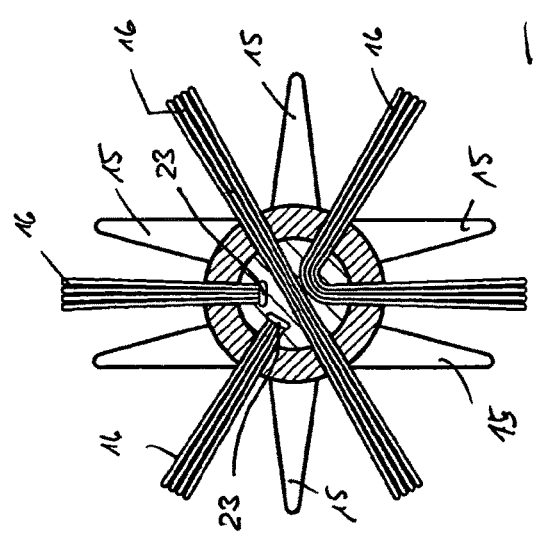
FIG. 16 is a sectional view with different alternatives of fastening the bristles.

FIG. 16 shows alternative possibilities for fastening a bristle bundle 16 in the material of the support 11. A broadened head 23, with which the bristle bundle 20 is embedded in the material of the support 11, so that high resistance to pulling out is achieved in a positive-locking manner, is formed at the radially inner end of the bristle bundle 16 in a first embodiment shown in the top part of FIG. 16.

According to a second embodiment shown in the center of FIG. 1, the bristle bundle 20 is so long that it passes completely through the material of the support 11 and projects from this on opposite sides.

According to a third embodiment shown at the bottom of FIG. 16, the bristle bundle is bent in a V-shaped pattern and embedded with the base section of the V shape in the material of the support 11, with the legs of the V shape projecting radially. A very high level of safety against pulling out is achieved here as well.

Figure 17:
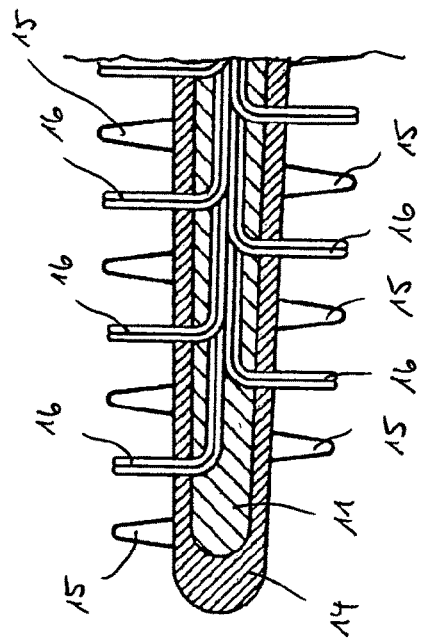
FIG. 17 is a sectional view with L-shaped bristle bundles.

FIG. 17 shows another embodiment of the fastening of the bristle bundle 16. The bristle bundle 16 is bent in an L-shaped pattern, and one leg of the L shape extends in the longitudinal direction of the interdental cleaner within the material of the support 11, while the other leg of the L shape extends at right angles thereto, i.e., radially to the longitudinal direction of the interdental cleaner and projects radially.

Figure 18:
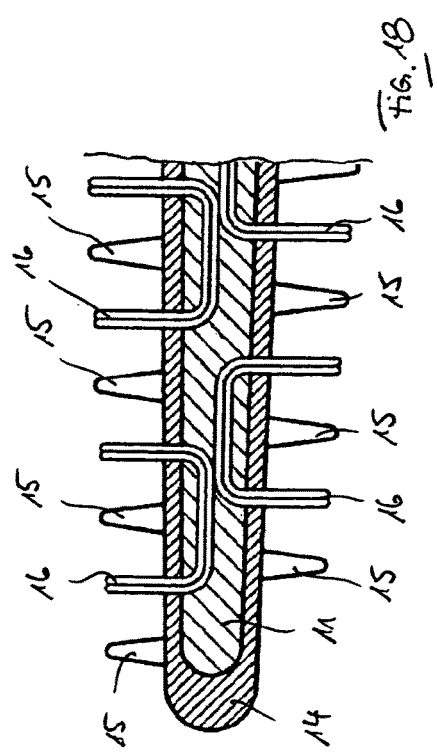
FIG. 18 is a sectional view with U-shaped bristle bundles.

According to FIG. 18, the bristle bundle 16 is bent in a U-shaped pattern and has a preferably horizontal base section and two legs projecting therefrom. The bristle bundle 16 is embedded with the base section in the material of the support 11 and is held in same, while the two legs project radially.

While specific embodiments of the invention have been shown and described in detail to illustrate the application of the principles of the invention, it will be understood that the invention may be embodied otherwise without departing from such principles.

The invention claimed is:

1. An interdental cleaner for removing material from a tooth surface, the interdental cleaner comprising:
a rod-like support formed of a first plastic material;
a cover injection molded on the support, said cover covering the support, having a tubular shape, and comprising a second plastic material, wherein a structuring is formed on an outer side of the cover, said structuring having a plurality of injection molded fingers projecting with a radial component from the cover and said plurality of fingers comprise the same plastic material of the cover and said plurality of fingers are connected with the cover in one piece, said plurality of fingers being injection molded together with the cover on the support, the structuring having a bristle border with one or more of a plurality of prefabricated bristle bundles and prefabricated individual bristles, which project with a radial component from the cover, and said one or more of said plurality of bristle bundles and individual bristles are formed independent from formation of said cover and said support, each bristle or bristle bundle having a maximum diameter of 0.25 mm, the one or more plurality of bristle bundles and individual bristles pass through the second plastic material of the cover and said one or more of said plurality of bristle bundles and individual bristles are held in the support and said one or more of said plurality of bristle bundles and individual bristles are embedded in both the cover and the support, the one or more of the bristle bundles and the individual bristles pass radially through the support and the second plastic material of the cover, and the one or more of said one bristle bundles and the individual bristles project from said support and the second plastic material of the cover on opposite sides.

2. An interdental cleaner in accordance with claim 1, wherein said one or more of said plurality of bristle bundles and individual bristles are arranged distributed over a circumference of the cover, forming at least one bristle crown, each of said bristles being smaller than said plurality of fingers, and said bristles being separate and discrete from each other.

3. An interdental cleaner in accordance with claim 2, wherein said plurality of fingers are arranged distributed over a circumference of the cover, forming at least one finger crown.

4. An interdental cleaner in accordance with claim 3, wherein the at least one bristle crown comprises multiple bristle crowns and wherein the at least one finger crown comprises multiple finger crowns, and the bristle crowns and the finger crowns are arranged alternatingly in a longitudinal direction of the cover.

5. An interdental cleaner in accordance with claim 1, wherein at least some of the one or more of said plurality of bristle bundles and individual bristles project radially beyond the fingers.

6. An interdental cleaner in accordance with claim 1, wherein at least some of the fingers project radially over the one or more of said plurality of bristle bundles and individual bristles by a measure.

7. An interdental cleaner in accordance with claim 1, wherein the one or more of said plurality of bristle bundles and individual bristles are arranged in at least one row of bristles extending in a longitudinal direction of said cover.

8. An interdental cleaner in accordance with claim 7, wherein the at least one row of bristles extends in a straight line in the longitudinal direction of the cover.

9. An interdental cleaner in accordance with claim 7, wherein the at least one row of bristles extends helically in the longitudinal direction of the cover.

10. An interdental cleaner in accordance with claim 1, wherein one or more of one said bristle bundle and at least one individual bristle passes through at least one of the fingers.

11. An interdental cleaner in accordance with claim 10, wherein the one or more of one said bristle bundle and the at least one individual bristle exits from the at least one of the fingers at a radially outer end thereof.

12. An interdental cleaner in accordance with claim 10, wherein 1 to 4 individual bristles pass through the at least one of the fingers.

13. An interdental cleaner in accordance with claim 1, wherein the one or more of said plurality of bristle bundles and individual bristles are held in the support at their radially inner end.

14. An interdental cleaner in accordance with claim 1, wherein
said bristle border is embedded in said support by injection molding of said support around said bristle border.

15. An interdental cleaner in accordance with claim 1, wherein:
said bristles have a smaller dimension than the fingers, the smaller shape being configured to enter gaps and spaces which can not be cleaned with the fingers.

16. An interdental cleaner, comprising:
a rod-like support formed of a first plastic material;
a cover mounted on said support, said cover being arranged on, and completely circumferentially around an outside radial surface of said support, said cover comprising a second plastic material;
a plurality of fingers projecting with a radial component from said cover, said plurality of fingers and said cover being formed of a same plastic material, said plurality of fingers and said cover being formed in one piece;
a bristle border having a plurality of bristles, said plurality of bristles being embedded in said support and in said cover, said plurality of bristles having ends arranged to project radially outward from said cover, each of said plurality of bristles being formed by monofilaments or multifilaments with a maximum diameter of 0.25 mm, said each of said plurality of bristles being separate and discrete from said support, said plurality of bristles passing radially through the support, and said plurality of bristles projecting from said support on opposite sides, said each of said plurality of bristles being spaced from said plurality of fingers, each of said plurality of bristles being separate and discrete from each other.

17. An interdental cleaner in accordance with claim 16, wherein:
said bristle border is embedded in a portion of said cover which circumferentially surrounds said support.

18. An interdental cleaner in accordance with claim 16, wherein:
said bristle border comprises either a plurality of individual spaced bristles, or a bundle of bristles;
said bristle border is embedded in said cover by injection molding of said cover onto said support, said cover completely contacting said bristle border around a circumference of said bristle border.

19. An interdental cleaner in accordance with claim 16, wherein:
said bristle border comprises either a plurality of individual spaced bristles, or a bundle of bristles;
said bristle border is embedded in said support by injection molding of said support around said bristle border, said cover completely contacting said bristle border around a circumference of said bristle border.

20. An interdental cleaner in accordance with claim 16, wherein:
said bristles are smaller than said fingers.

* * * * *